United States Patent
Liu et al.

(10) Patent No.: US 9,537,948 B2
(45) Date of Patent: Jan. 3, 2017

(54) METHOD AND APPARATUS FOR CHUNK-LEVEL SHARING-BASED OPEN VIRTUALIZATION FORMAT (OVF) PACKAGE DISTRIBUTION THROUGH DEPENDENCY ANALYSIS

(71) Applicant: International Business Machines Corporation, Armonk, NY (US)

(72) Inventors: Xin Peng Liu, Beijing (CN); Su Ying Rui, Beijing (CN); Xi Ning Wang, Beijing (CN); Chun Guang Zeng, Beijing (CN); Pu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 14/148,613

(22) Filed: Jan. 6, 2014

(65) Prior Publication Data

US 2014/0244845 A1   Aug. 28, 2014

(30) Foreign Application Priority Data

Feb. 28, 2013  (CN) .......................... 2013 1 0064426

(51) Int. Cl.
*H04L 29/08* (2006.01)
*G06F 9/50* (2006.01)

(52) U.S. Cl.
CPC ......... *H04L 67/1065* (2013.01); *G06F 9/5077* (2013.01); *H04L 67/10* (2013.01); *H04L 67/1097* (2013.01)

(58) Field of Classification Search
CPC .... G06F 9/5077; H04L 67/10; H04L 67/1065; H04L 67/1097
See application file for complete search history.

(56) References Cited

U.S. PATENT DOCUMENTS 8,060,703 B1 * 11/2011 Desai .................... G06F 12/023
                                                  711/147
9,166,947 B1 * 10/2015 Tian ...................... H04L 61/255
(Continued)

FOREIGN PATENT DOCUMENTS

EP          2503449         9/2012
WO       WO2012069296       5/2012

OTHER PUBLICATIONS

Kecskemeti et al., "An Approach for Virtual Appliance Distribution for Service Deployment," Sep. 6, 2010, pp. 1-13.
(Continued)

*Primary Examiner* — Sargon Nano
*Assistant Examiner* — Afroza Sultana
(74) *Attorney, Agent, or Firm* — Zilka-Kotab, PC (57) ABSTRACT

According to various embodiments, a method and apparatus for providing a virtual appliance are described. The method includes: obtaining metadata of a specific virtual appliance based on a received request for obtaining the specific virtual appliance, the metadata describing information about virtual machines involved in the specific virtual appliance, determining an association relationship between the specific virtual appliance and at least one other virtual appliance according to the metadata, and providing resource information for obtaining the specific virtual appliance according to the association relationship, the resource information including a plurality of resource addresses, at least one of the plurality of resource addresses pointing to a storage location of the at least one other virtual appliance. In this way, more resource options for obtaining a specific virtual appliance are provided, thereby improving the efficiency of obtaining the virtual appliance and reducing network transmission pressure on a cloud data center.

12 Claims, 7 Drawing Sheets

(56) References Cited

U.S. PATENT DOCUMENTS

| | | | | |
|---|---|---|---|---|
| 2003/0081000 | A1* | 5/2003 | Watanabe | G06F 17/241 |
| | | | | 715/751 |
| 2007/0294676 | A1* | 12/2007 | Mellor | G06F 8/65 |
| | | | | 717/139 |
| 2009/0300149 | A1* | 12/2009 | Ferris | H04L 47/826 |
| | | | | 709/222 |
| 2009/0319502 | A1* | 12/2009 | Chalouhi | H04L 67/104 |
| 2011/0107330 | A1 | 5/2011 | Freundlich et al. | |
| 2011/0126207 | A1 | 5/2011 | Wipfel et al. | |
| 2011/0265087 | A1 | 10/2011 | Chen et al. | |
| 2012/0016970 | A1 | 1/2012 | Shah et al. | |
| 2012/0246639 | A1 | 9/2012 | Kashyap et al. | |
| 2012/0246642 | A1 | 9/2012 | Pafumi et al. | |
| 2012/0266170 | A1 | 10/2012 | Zimmerman et al. | |
| 2013/0132951 | A1* | 5/2013 | Shah | G06F 9/45558 |
| | | | | 718/1 |
| 2014/0040863 | A1* | 2/2014 | Hale | G06F 8/36 |
| | | | | 717/123 |
| 2014/0059375 | A1* | 2/2014 | McElhoe | G06F 11/1484 |
| | | | | 714/4.1 |

OTHER PUBLICATIONS

"NIST Cloud Computing Program," Nov. 15, 2010, The National Institute of Standards and Technology (NIST), http://www.nist.gov/itl/cloud/, pp. 1-2.

Mell et al., "The NIST Definition of Cloud Computing," Oct. 7, 2009, National Institute of Standards and Technology, Information Technology Laboratory, Version 15, pp. 1-2.

Mell et al., "The NIST Definition of Cloud Computing: Recommendations of the National Institute of Standards and Technology," Sep. 2011, NIST Special Publication 800-145, pp. 1-7.

\* cited by examiner

```
 0.  <VirtualSystem ovf:id="vm">
 1.    <Info>A virtual machine</Info>
 2.    <Name>Windows XPProfessional</Name>
 3.    <OperatingSystemSection ovf:id="67" vmw:osType="winXPProGuest">
 4.      <Info>The kind of installed guest operating system</Info>
 5.    </OperatingSystemSection>
 6.    <VirtualHardwareSection>
 7.      <Info>Virtual hardware requirements</Info>
 8.      <System>
 9.        <vssd:ElementName>Virtual Hardware Family</vssd:ElementName>
10.        <vssd:InstanceID>0</vssd:InstanceID>
11.        <vssd:VirtualSystemIdentifier>Windows XPProfessional</vssd:VirtualSystemIdentifier>
12.        <vssd:VirtualSystemType>vmx-07</vssd:VirtualSystemType>
13.      </System>
14.      <Item>
15.        <rasd:AllocationUnits>hertz * 10^6</rasd:AllocationUnits>
16.        <rasd:Description>Number of Virtual CPUs</rasd:Description>
17.        <rasd:ElementName>1 virtual CPU(s)</rasd:ElementName>
18.        <rasd:InstanceID>1</rasd:InstanceID>
19.        <rasd:ResourceType>3</rasd:ResourceType>
20.        <rasd:VirtualQuantity>1</rasd:VirtualQuantity>
21.      </Item>
22.      <vmw:Config ovf:required="false" vmw:key="cpuHotAddEnabled" vmw:value="false"/>
23.    </VirtualHardwareSection>
24.  </VirtualSystem>
```

METHOD AND APPARATUS FOR CHUNK-LEVEL SHARING-BASED OPEN VIRTUALIZATION FORMAT (OVF) PACKAGE DISTRIBUTION THROUGH DEPENDENCY ANALYSIS

RELATED APPLICATIONS

The present application claims priority to Chinese Patent Application Ser. No. 201310064426.9, filed Feb. 28, 2013, which is herein incorporated by reference.

BACKGROUND

The present invention relates to virtual appliances, and more particularly, the present invention relates to a method and apparatus for providing a virtual appliance.

With the development of virtual technology, a virtual machine is able to provide various applications and services, like a true, stand-alone computer. On this basis, one or more virtual machines may be packaged together to provide a pre-built software environment, thus forming a virtual appliance. For instance, in one example, three virtual machines: VM1, VM2 and VM3, may be used to build a virtual appliance, wherein the three virtual machines are installed with different software programs to perform different functions, respectively. For example, virtual machine VM1 may be used to perform a variety of applications, VM2 may be used to provide a database, and VM3 may be used as a proxy server. These "dedicated" virtual machines are packaged together to provide a complete operating environment collectively, thereby forming a virtual appliance. In this example, the multiple virtual machines forming the virtual appliance are maintained, updated, and managed collectively as a unit.

To form a desired virtual appliance, there are a variety of standards and approaches for packaging virtual machines that appear in the prior art. Open Virtualization Format (OVF) is a standard in common use currently, for packaging and distributing virtual appliances. With the OVF standard, virtual appliances may be installed and deployed across platforms simply and flexibly. According to the OVF standard, multiple virtual machines are packaged into one OVF package. Typically, an OVF package comprises an OVF descriptor with suffix .ovf, and further optionally comprises a manifest with suffix .mf and a certificate with suffix .cert. The OVF descriptor is used to describe configuration information of each virtual machine included in the OVF package. In addition, the OVF package also generally includes disk image files of respective virtual machines forming the virtual appliance. These files store data in virtual disks in the form of images. Accordingly, a disk image file usually has a large size, often about hundreds of Gigabytes (GB) or more.

According to user demands for various virtual appliances, many data centers are configured to provide virtual appliances, such as in an OVF form, to users according to user needs. In particular, in a cloud computing environment, especially in an Infrastructure as a Service (IaaS) mode, a cloud data center may provide virtual machines and virtual appliances to diverse users. However, as mentioned before, an image file involved in a virtual appliance often reaches hundreds of GB in size, and therefore, it often takes a long time to read such a file and transfer it over the network to a user terminal. For example, today's cloud data centers usually need to take tens of minutes to provide a single virtual machine. On the other hand, many cloud data centers use centralized servers to store and distribute virtual machine related data. Such centralized servers have limited network interfaces, which becomes a bottleneck for processing a large number of network requests. Therefore, in a case where a large population of users request access to or to obtain virtual appliances at the same time, the performance of cloud data centers providing virtual appliances will be further reduced.

Therefore it is desired to improve the existing solutions to improve the performance of the provisioning of virtual appliances.

BRIEF SUMMARY

According to one embodiment, a method for providing a virtual appliance is provided. The method comprises obtaining metadata of a specific virtual appliance based on a received request for obtaining the specific virtual appliance, the metadata describing information about virtual machines involved in the specific virtual appliance, determining an association relationship between the specific virtual appliance and at least one other virtual appliance according to the metadata, and providing resource, information for obtaining the specific virtual appliance according to the association relationship, the resource information including a plurality of resource addresses, at least one of the plurality of resource addresses pointing to a storage location of the at least one other virtual appliance.

According to another embodiment, an apparatus for providing a virtual appliance is provided. The apparatus comprises a metadata obtaining unit configured to obtain metadata of a specific virtual appliance based on a received request for obtaining the specific virtual appliance, the metadata describing information about virtual machines involved in the specific virtual appliance, an association relationship determining unit configured to determine an association relationship between the specific virtual appliance and at least one other virtual appliance according to the metadata, and a resource information providing, unit configured to provide resource information for obtaining the specific virtual appliance according to the association relationship, the resource information including a plurality of resource addresses, at least one of the plurality of resource addresses pointing to a storage location of the at least one other virtual appliance.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

Through the more detailed description of some embodiments of the present disclosure in the accompanying drawings, the above and other objects, features, and advantages of the present disclosure will become more apparent, wherein the same reference generally refers to the same components in the embodiments of the present disclosure.

DETAILED DESCRIPTION

The following description is made for the purpose of illustrating the general principles of the present invention and is not meant to limit the inventive concepts claimed herein. Further, particular features described herein may be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Considering the problems described previously, it is proposed to improve the provision of a virtual appliance to improve efficiency according to various embodiments described herein.

According, to one general embodiment, a method for providing a virtual appliance is provided. The method comprises obtaining metadata of a specific virtual appliance based on a received request for obtaining, the specific virtual appliance, the metadata describing information about virtual machines involved in the specific virtual appliance, determining an association relationship between the specific virtual appliance and at least one other virtual appliance according to the metadata, and providing resource information for obtaining the specific virtual appliance according to the association relationship, the resource information including a plurality of resource addresses, at least one of the plurality of resource addresses pointing to a storage location of the at least one other virtual appliance.

According to another general embodiment, an apparatus for providing a virtual appliance is provided. The apparatus comprises a metadata obtaining unit configured to obtain metadata of a specific virtual appliance based on a received request for obtaining the specific virtual appliance, the metadata describing information about virtual machines involved in the specific virtual appliance, an association relationship determining unit configured to determine an association relationship between the specific virtual appliance and at least one other virtual appliance according to the metadata, and a resource information providing unit configured to provide resource information for obtaining the specific virtual appliance according to the association relationship, the resource information including a plurality of resource addresses, at least one of the plurality of resource addresses pointing to a storage location of the at least one other virtual appliance.

With the method and apparatus according to various embodiments, more resource options may be provided to a user when the user requests a cloud data center to obtain a virtual appliance, thereby improving the efficiency of the user obtaining the virtual appliance and reducing network transmission pressure on the cloud data center.

Some preferable embodiments will be described in more detail with reference to the accompanying drawings, in which preferable embodiments of the present disclosure have been illustrated. However, the present disclosure may be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

It is understood in advance that although this disclosure includes a detailed description on cloud computing, implementation of the teachings recited herein are not limited to a cloud computing environment. Rather, embodiments are capable of being implemented in conjunction with any other type of computing environment now known or later developed.

Cloud computing is a model of service delivery for enabling convenient, on demand network access to a shared pool of configurable computing resources (e.g. networks, network bandwidth, servers, processing, memory, storage, applications, virtual machines, and services) that may be rapidly provisioned and released with minimal management effort or interaction with a provider of the service. This cloud model may include at least five characteristics, at least three service models, and at least four deployment models.

Characteristics are as follows:

On-demand self-service: a cloud consumer may unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms, e.g., mobile phones, laptops, personal digital assistants (PDAs), etc.

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, datacenter, etc.).

Rapid elasticity: capabilities may be rapidly and elastically provisioned, in some cases automatically, to quickly scale out and rapidly released to quickly scale in. To the consumer, the capabilities available for provisioning often appear to be unlimited and may be purchased in any quantity at any time.

Measured service: cloud systems automatically control and optimize resource use by leveraging a metering capability at some level of abstraction appropriate to the type of service (e.g., storage, processing, bandwidth, active user accounts, etc.). Resource usage may be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or obtained applications created using programming, languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which may include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, compliance considerations, etc.). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
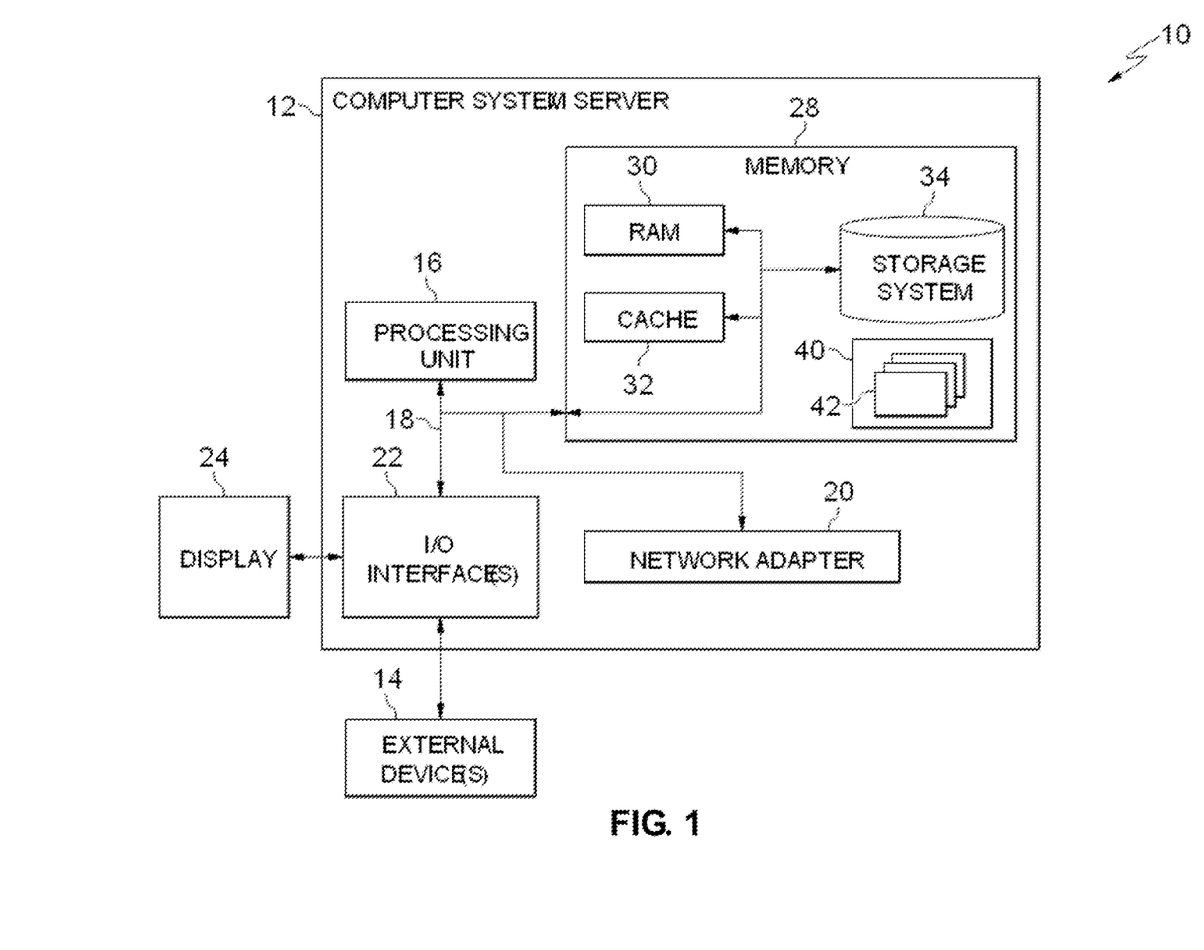
FIG. 1 shows a cloud computing node according to one embodiment.

Referring now to FIG. 1, a schematic of an example of a cloud computing node is shown. Cloud computing node 10 is only one example of a suitable cloud computing node and is not intended to suggest arty limitation as to the scope of use or functionality of embodiments described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, a distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing, environments where tasks are performed by remote processing devices that are linked through a communications network. In a distributed, cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the from of volatile memory, such as random access memory (RAM) 30 and/or cache memory 32. Computer system/server 12 may further include other removable/non-removable, volatile/non-volatile computer system storage media. By way of example only storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
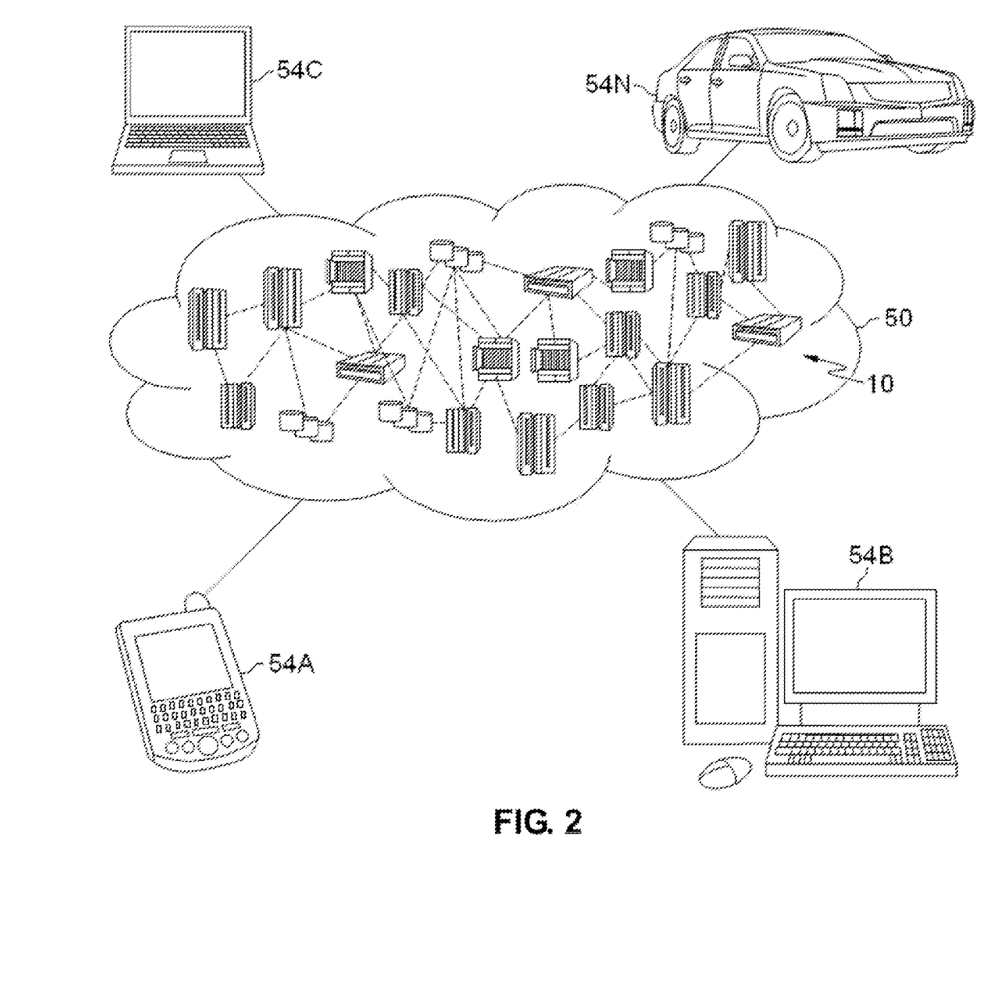
FIG. 2 shows a cloud computing environment according to one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (FDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community Public, or Hybrid, clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown FIG. 2 are intended to be illustrative only and that computing nodes 10 and cloud computing, environment 50 may communicate with any type of computerized device over any type of network and/or network addressable connection (e.g., using a web browser).

Figure 3:
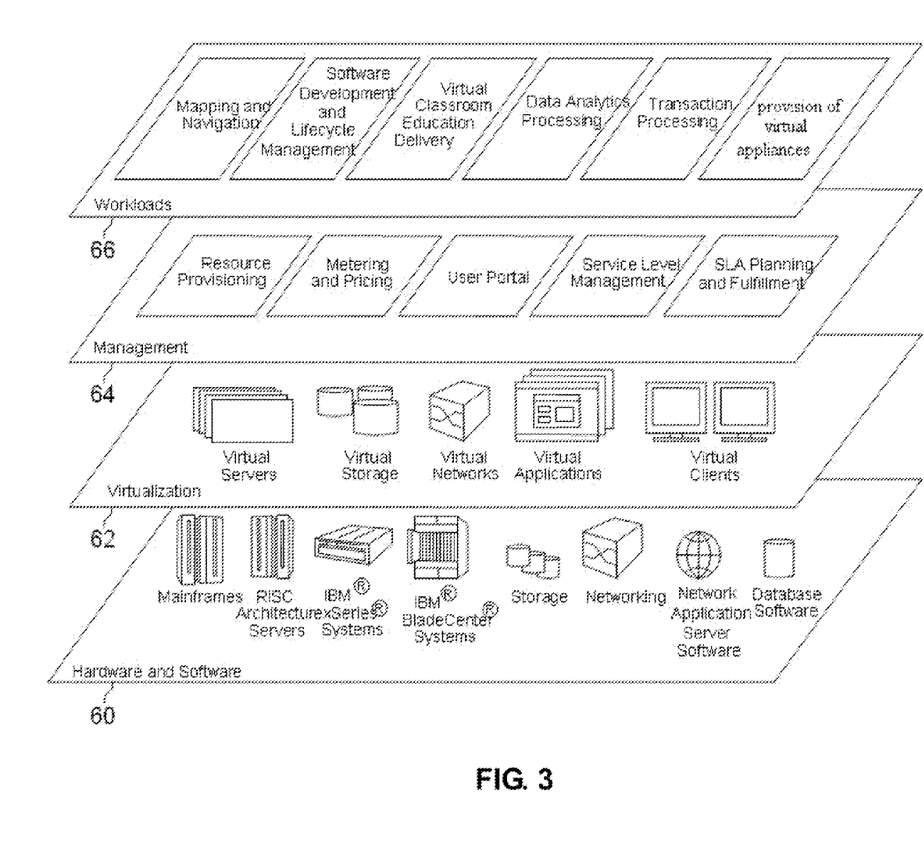
FIG. 3 shows an abstract model layer according to one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments are not limited thereto. As depicted, the following layers and corresponding functions are provided.

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual, entities may be provided: virtual servers; virtual storage; virtual networks, including virtual private networks; virtual applications and operating systems; and virtual clients.

In one example, management layer 64 may provide the functions described below. Resource provisioning provides dynamic procurement Of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of cloud computing resources for which a future requirement is anticipated in accordance with an SLA.

Workloads layer 66 provides examples of functionality for which the cloud computing environment may be utilized. Examples of workloads and functions which may be provided, from this layer include: mapping and navigation; software development and lifecycle management; virtual classroom education delivery; data analytics processing; transaction processing; and provision of virtual appliances.

The embodiments will be described below. In one embodiment, in order to provide a virtual appliance to a user, metadata corresponding to the virtual appliance is analyzed first the metadata describing information of virtual machines involved in the virtual appliance. Through the analysis of such metadata, an association relationship or "dependency" relationship between the virtual appliance and other virtual appliances may be determined, which shows whether different virtual appliances share the same or similar virtual machine therebetween. Based on such association relationship, a plurality of resource addresses may be returned to a user when the user requests to obtain this virtual appliance, such resource addresses including not only a resource address pointing to a storage location of this virtual appliance in a cloud data center, but also resource addresses pointing to other virtual appliances associated with this virtual appliance. Thus, the user may selectively obtain a desired virtual appliance through the resource addresses pointing to the other virtual appliances, thereby improving downloading speed and reducing transmission pressure of the cloud data center.

Figure 4:
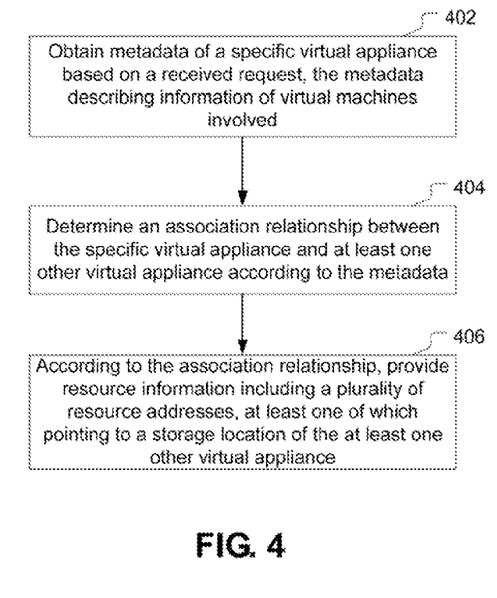
FIG. 4 shows a flow chart of a method for providing a virtual appliance according to one embodiment.

FIG. 4 shows a flow chart of a method for providing, a virtual appliance according to an embodiment. As shown in FIG. 4, the method for providing a virtual appliance comprises: step 402 of obtaining metadata of a specific virtual appliance based on a received request for obtaining the specific virtual appliance, the metadata describing information of virtual machines involved in the specific virtual appliance; step 404 of determining an association relationship between the specific virtual appliance and at least one other virtual appliance according to the metadata; and step 406 of providing resource information for obtaining the specific virtual appliance according to the association relationship, the resource information including a plurality of resource addresses, at least one of the plurality of resource addresses pointing to a storage location of the at least one other virtual appliance. The execution of the above steps is described below in combination with specific examples.

First, in step 402, based on a received request for obtaining a specific virtual appliance, metadata for describing the virtual appliance is obtained. More specifically, step 402 includes, first, determining the specific virtual appliance to be obtained based on the received request, and then, obtaining corresponding metadata based on the determined virtual appliance.

In general, the user request comprises a unique identifier of the specific virtual appliance to be obtained. Based on the identifier, the cloud data center may determine the specific virtual appliance. In one embodiment, the user may also specify one or more virtual machines and request the data center to package them into the specific virtual appliance. In this case, per the request from the user, the cloud data center may package the specified virtual machine(s) to form the desired virtual appliance. The virtual appliance formed is just the specific virtual appliance to be obtained.

In one embodiment in order to accelerate the transmission of image files in the virtual appliance, it is desired to adopt a peer-to-peer (P2P) transmission manner. The P2P transmission manner has been known to those skilled in the art. For P2P transmission, the user needs to firstly obtain torrent seed file, which comprises server information and target file information. Specifically, the server information specifies the address of a server and settings of the server. However, the server is only responsible for providing information of available download sources of the target file, and does not necessarily store the target file. The target file information is a file generated by the server by dividing the target file into blocks virtually and encoding each block specifically. Once the user is connected to the server through the seed file, the server recognizes the target file involved in the seed file, and returns information of available download sources of the target file to the user. The user may then obtain the target file from the available download sources. In the case of providing a virtual appliance by the cloud data center, the cloud data center may act as the server of the P2P transmission. Accordingly, in one embodiment, the user may use the torrent seed file to request for obtaining the specific virtual appliance. In response to such request issued by using the torrent file, in step 402, the specific virtual appliance to be obtained may be determined through analysis of target file information in the torrent file.

On the basis of determining the specific virtual appliance to be obtained, metadata corresponding to the specific virtual appliance may be obtained. In general, a virtual appliance is formed by compressing and packaging one or more virtual machines, and accordingly, a virtual appliance may correspond to a compressed package or a data packet formed by packaging, which contains disk image files of packaged virtual machines. In one embodiment, the metadata of the virtual appliance may be embodied as attribute information of the compressed package or data packet. In another embodiment, the above data packet directly comprises a descriptor file describing each virtual machine. Such descriptor file may be used as metadata of the corresponding virtual appliance. Therefore, the process of obtaining metadata of the specific virtual appliance may comprise extracting the descriptor file describing the involved virtual machines from the packaged data packet corresponding to the specific virtual appliance and using the descriptor file as metadata of the specific virtual appliance.

In one embodiment, the specific virtual appliance is formed by packaging the virtual machine using the OVF standard, and therefore corresponds to an OVF package stored in the cloud data center. As mentioned before, the OVF package comprises an OVF descriptor for describing configuration information of respective virtual machines involved in the virtual appliance. Therefore, the OVF descriptor may act as metadata of the specific virtual appliance. Accordingly, in step 402, the metadata of the specific virtual appliance may be obtained by extracting the OVF descriptor from the corresponding OVF package.

In another embodiment, the specific virtual appliance uses other standards for packaging, thereby corresponding to data packets of different formats. In this case, similarly, descriptor files of different formats may be extracted with respect to the formats of the data packets as metadata of the virtual appliance.

On the basis of metadata of the specific virtual appliance requested by the user, in step 404, according, to the metadata above, the association relationship between the specific virtual appliance and at least one other virtual appliance is determined, the association relationship being intended to show sharing relation of the same or similar virtual machine between the specific virtual appliance and other virtual appliances.

Figure 5:
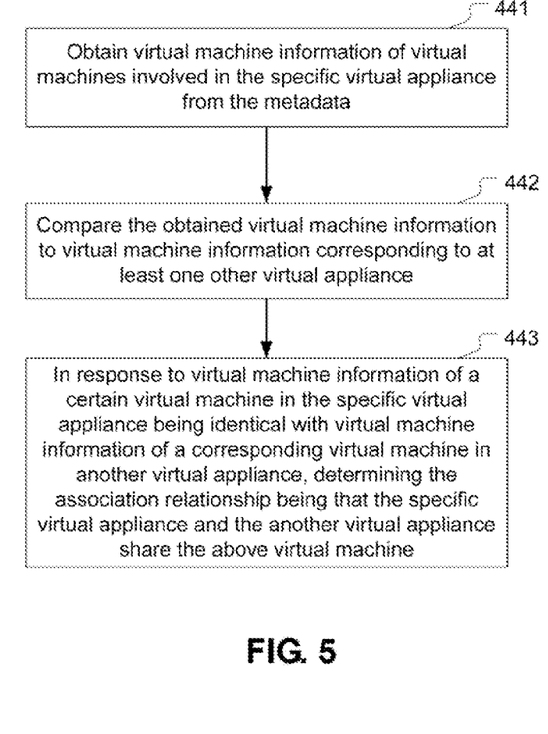
FIG. 5 shows sub steps of determining an association relationship according to one embodiment.

FIG. 5 shows sub steps of determining the association relationship above according to an embodiment, namely, sub steps of the above step 404. As shown in FIG. 5, in order to determine the association relationship between the specific virtual appliance and other virtual appliances, first, in step 441, virtual machine information of respective virtual machines involved in the specific virtual appliance is obtained from the metadata. As mentioned before, in general, metadata, especially the descriptor file in the packaged data packet corresponding to the specific virtual appliance, is used to describe respective virtual machines involved in the specific virtual appliance. Therefore, based on metadata such as the descriptor file, it may be easy to obtain virtual machine information of respective virtual machines involved in the specific virtual appliance. The virtual machine information may comprise a virtual machine name, version, (virtual) hardware parameters, operating system information and the like. It may be appreciated that specific items of the virtual machine information may be pre-set according to needs, and therefore may be not limited to the above contents.

Figure 6:
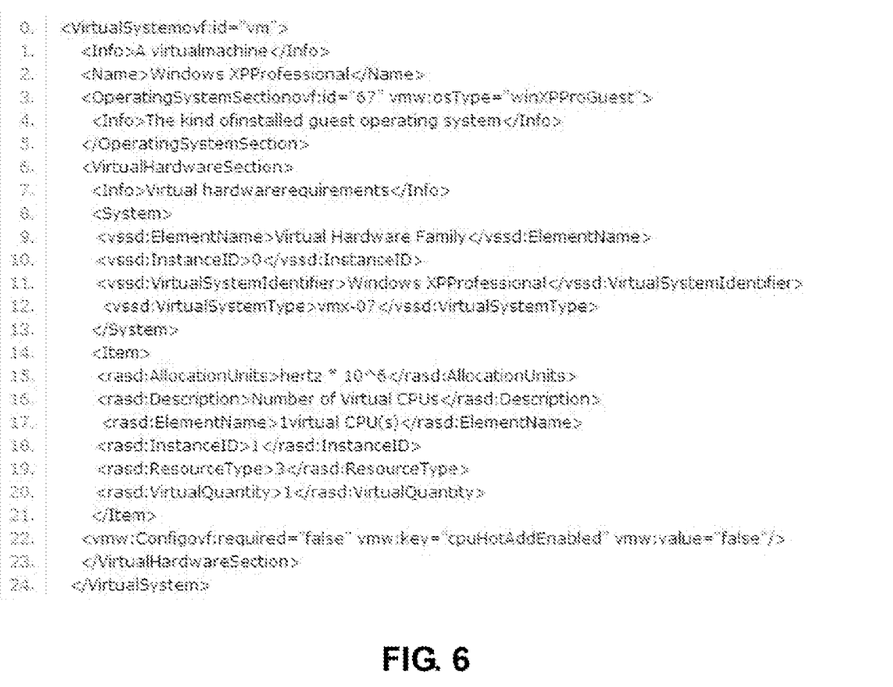
FIG. 6 shows contents of one section of an Open Virtualization Format (OVF descriptor according to one example.

In a specific example, metadata of the specific virtual appliance is an OVF descriptor. As know to those skilled in the art, the OVF descriptor comprises a plurality of sections, describing disk information, network configuration information, software information, etc. respectively. FIG. 6 shows contents of one section of an OVF descriptor according to an example. Specifically, the section shown in FIG. 6 describes hypervisor, system environment, CPU configuration and the like of a virtual machine. Accordingly, virtual machine information may be set to comprise one or more of the above items. In other embodiments, the virtual machine information may be set to comprise other items or more items.

Then, in step 442, the virtual machine information obtained in step 441 is compared to virtual machine information corresponding to at least one other virtual appliance. It may be appreciated that, for other virtual appliances, corresponding metadata thereof may be obtained similarly, and then the virtual machine information involved may be obtained from the metadata. Thus, the virtual machine information corresponding to the specific virtual appliance may be compared to the virtual machine information corresponding to other virtual appliances. Since virtual machine information may comprise a plurality of items, the above comparison comprises comparing contents of respective items contained in the virtual machine information one by one.

Further, in step 443, in response to virtual machine information of a certain virtual machine in the specific virtual appliance being identical with virtual machine information of a corresponding virtual machine in the at least one other virtual appliance, the association relationship is determined as the specific virtual appliance and the at least one other virtual appliance sharing the above certain virtual machine.

In one embodiment, if each item in virtual machine information of two virtual machines is the same correspondingly, then it is considered that the virtual machine information is the same. In another embodiment, a proportion may be predetermined, and if there are a predetermined proportion of items in the virtual machine information of two virtual machines being the same, it is considered that the virtual machine information is the same. In step 443, any of the above criteria may be used to determine whether the virtual machine information is the same. In the case that virtual machine information of a certain virtual machine in the specific virtual appliance is determined as the same as virtual machine information of a corresponding virtual machine in another virtual appliance, in one embodiment, the two virtual machines may be considered the same; accordingly, it is considered that the specific virtual appliance and the another virtual appliance share the certain virtual machine.

In one embodiment, the description about virtual machine in metadata further additionally includes customization information, which indicates settings by users to specific applications of a virtual machine. In one embodiment, for example in the case of OVF descriptor, the customization information is recorded in the form of a script. The OVF descriptor introduces customization information through script reference. If virtual machines VM1 and VM2 have the same virtual machine information, but VM2 additionally comprises customization information, VM2 may be obtained by applying customization information of VM2 on the basis of obtaining image of VM1. In such case, if the virtual machine information of two virtual machines is the same but the customization information is different, it may be considered that the two virtual machines are similar virtual machines. Accordingly, in one embodiment, on the basis of step 443, additionally, in response to the virtual machine information of the certain virtual machine being the same as the virtual machine information of the corresponding virtual machine while the customization information being different, the association relationship is determined as the specific virtual appliance and the at least one other virtual appliance partially sharing the certain virtual machine hereinabove.

In one embodiment, the association relationship comprises a direct association relationship between the specific virtual appliance and the at least one other virtual appliance. In one embodiment, the association relationship further comprises an indirect association relationship between the specific the specific virtual appliance and at least one other virtual appliance. In an example, the specific virtual appliance and virtual appliance 1 share several virtual machines, and hence have a direct association relationship. At the same time, the virtual appliance 1 and another virtual appliance 2 also have an association relationship of virtual machine sharing. Then, it may be considered that the specific virtual appliance and the virtual appliance 2 have an indirect association relationship by means of the intermediate virtual appliance 1.

The above association relationship may be recorded in a variety of forms in one embodiment, the association relationship is recorded in the form of a list including identifiers of other virtual appliances associated with the specific virtual appliance. In another embodiment, the association relationship is recorded in the form of a topological graph. Such graphic recording manner is especially suitable for simultaneously recording direct and indirect association relationships between various virtual appliances.

In one embodiment, the association relationship further comprises information about degree of association between the specific virtual appliance and at least one other virtual appliance. The degree of association depends on the following factors: number of virtual machines shared by the specific virtual appliance and other virtual appliances, the degree of sharing (complete sharing or partial sharing), type of association (direct association or indirect association), etc. The degree of association may be quantified based on the above factors.

In one embodiment, in response to the request in step 402, the steps 441-443 above are executed in real time, so as to determine the association relationship between the specific virtual appliance and other virtual appliances. In another embodiment, based on metadata of respective virtual appliances, a record of association relationship between respective virtual appliances is pre-calculated and maintained. It may be appreciated that, by taking respective virtual appliances in the cloud data center as the "specific virtual appliance" and thus executing the above steps 441-443, association relationships among various virtual appliances may be calculated, thereby forming the record of association relationship. When information of the virtual appliances changes, the above association relationships may be updated, thereby maintaining the record of association relationship. In such case, in step 404, information related with the specific virtual appliance may be read from the pre-calculated and maintained record of association relationship, thereby determining the association relationship between the specific virtual appliance and other virtual appliances.

On the basis of determining the association relationship between the specific virtual appliance and other virtual appliances, in step 406, according to the association relationship, resource information for obtaining the specific virtual appliance is provided, including resource addresses pointing to other virtual appliances.

Figure 7:
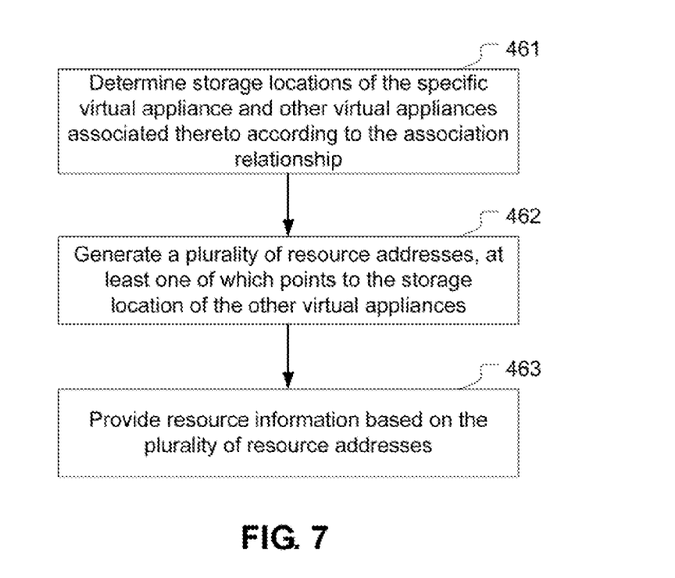
FIG. 7 shows steps of providing resource information according to one embodiment.

FIG. 7 shows steps of providing resource information according to one embodiment, namely, sub steps of step 406 above. As shown in FIG. 7, firstly in step 461, according to the association relationship, the storage locations of the specific virtual appliance and the at least one other virtual appliance associated with the specific virtual appliance are determined. In one embodiment, the storage locations above are storage locations of the specific virtual appliance and the at least one other virtual appliance in the cloud data center. In some cases, the cloud data center may be implemented by using distributed computing devices. Accordingly, in step 461, it is required to determine what location of which computing device to store respective virtual appliances. In one embodiment, the P2P transmission manner is used for transmission between the user and the cloud data center, and the user may also act as a serving terminal to provide file download. In such case, user devices of other users having downloaded or being downloading the specific virtual appliance and other virtual appliances associated thereto may also serve as download sources. Accordingly, step 461 of determining the storage locations further comprises determining, the storage locations of the specific virtual appliance and the at least one other virtual appliance in the user devices of other users.

Then, in step 462, a plurality of resource addresses are generated, wherein at least one resource address points to the storage location of the at least one other virtual appliance.

Specifically, in one embodiment, the plurality of resource addresses generated include at least one resource address pointing to the storage location of the specific virtual appliance, and at least one resource address pointing to the storage location of the at least one other virtual appliance. According to one embodiment, the resource addresses are provided in the form of http URL links.

As mentioned before, in one embodiment, the storage location is a storage location in the cloud data center. Based on such storage location, a resource address pointing to the storage location in the cloud data center may be generated. Since the storage locations of respective virtual appliances in the cloud data center are fixed, then in one embodiment, correspondence relationships between various virtual appliances and respective resource addresses pointing to their storage locations may be pre-maintained. In step 462, the resource address pointing to the specific virtual appliance and the resource address pointing to the at least one other virtual appliance may be generated according to the pre-maintained correspondence relationship.

In one embodiment, the storage locations further comprise storage locations of the specific virtual appliance and the at least one other virtual appliance in user devices of other users. At the time, in step 462, resource addresses pointing to the user devices of other users are generated. In one example, such resource addresses may comprise IP addresses, ports, access paths and the like of the user devices of other users.

Then, in step 463, resource information is provided based on the plurality of resource addresses. In one embodiment, the plurality of resource addresses generated in step 462 is directly provided as resource information. In another embodiment, the plurality of resource addresses generated in step 462 is ordered. The ordering may be performed according to one or more of the following criteria: degree of association between a virtual appliance related to the resource address and the specific virtual appliance, average access speed of a download source to which the resource address points, real-time access speed and the like. Thus, a plurality of resource addresses ordered is provided in resource information.

In one embodiment, the resource information also includes annotation information provided for at least a portion of the plurality of resource addresses. Such annotation information may further complementarily describe the resource addresses, for example, by specifying data portion (such as, which virtual machine) shared by the virtual appliance related to the resource address and the specific virtual appliance to be obtained, whether the sharing type is complete or partial sharing, and the like. Thus, the annotation information may help users in obtaining the required data portions accurately via the resource addresses.

Since resource information returned to the user provides a plurality of optional resource addresses for the user, the user may obtain the desired specific virtual appliance via these resource addresses selectively. In particular, when the resource address directly pointing to the storage location of the specific virtual appliance in the cloud data center is unavailable or the download speed is not ideal, part of virtual machine data of the specific virtual appliance may be obtained indirectly via resource addresses pointing to other virtual appliances associated. More specifically, in the P2P transmission manner, the user may also download and obtain from other users data of the specific virtual appliance and other virtual appliances associated thereto, thereby further increasing speed and efficiency of data obtaining. It may be appreciated that, in such case, the user will obtain data pieces of the specific virtual appliance from different resource addresses. As mentioned before, torrent file provided directed to the P2P transmission comprises target file information, which is a file generated by dividing the target file into a plurality of blocks and encoding the respective blocks. Here, Hash encoding is most commonly used. The Hash encoding is to encode inputted file contents into specific numbers using Hash function. By performing the same hash encoding on the downloaded file contents and comparing them with corresponding specific numbers stored in the torrent file, it may be determined whether the downloaded file contents are correct and complete. Therefore, in a case where the user obtains different data pieces of the specific virtual appliance from a plurality of different resource addresses respectively, the torrent file may be used to guarantee completeness and correctness of the data pieces from different resource addresses.

Figure 8:
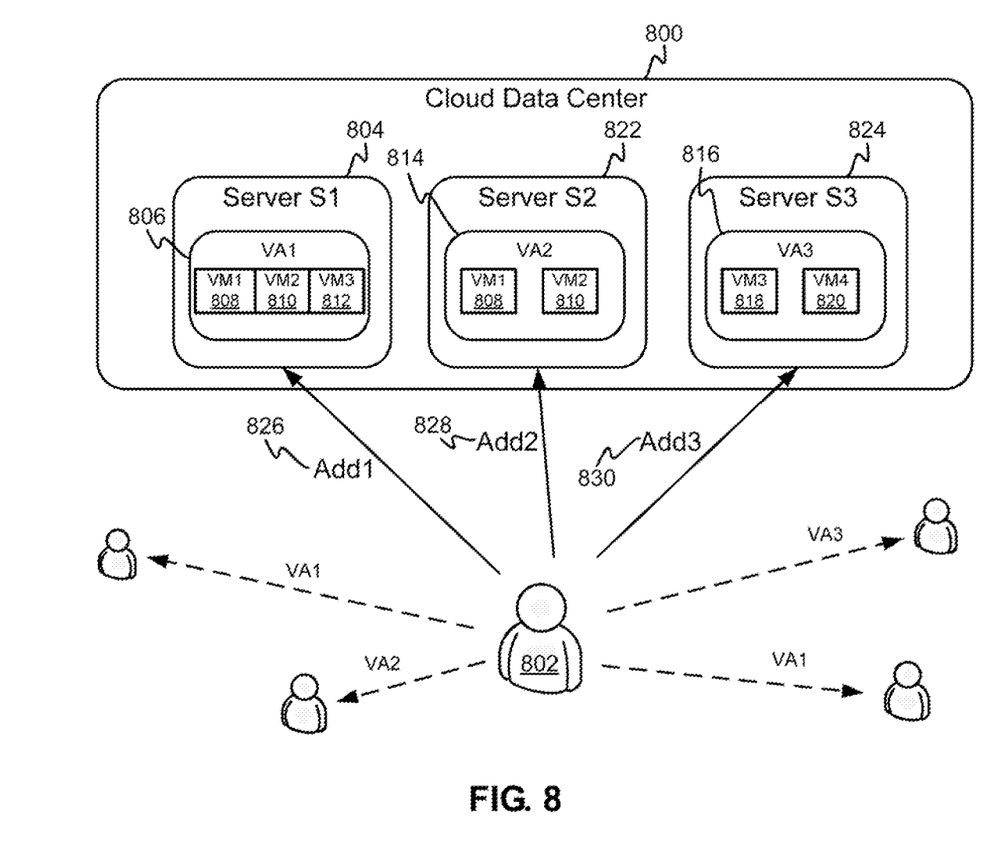
FIG. 8 shows an application scenario of one embodiment.

FIG. 8 shows an application scenario according to one embodiment. In the example shown in FIG. 8, user A 802 issues a request to the cloud data center 800 for the specific virtual appliance VA1 806, wherein VA1 806 relates to virtual machines VM1 808, VM2 810, and VM3 812. Through the analysis on metadata of VA1 806, the cloud data center 800 may determine that VA1 806 shares the same virtual machines VM1 808 and VM2 810 with another virtual appliance VA2 814, and shares the same virtual machine VM3 818 with another virtual appliance VA3 816. Therefore, the virtual appliance VA1 806 is associated with VA2 814 and VA3 816. And, the cloud data center 800 use distributed, computing devices, wherein VA1 806 is stored in server S1 804, VA2 814 is stored in server S2 822, and VA3 816 is stored in server S3 824. In such a case, the cloud data center 800 may provide to user A 802 resource addresses Add1 826, Add2 828, and Add3 830 pointing to VA1 806, VA2 814, and VA3 816, respectively.

Thus, in addition to obtaining data of virtual appliance VA1 806 from S1 804 storing VA1 806 directly, user A 802 may further obtain data of virtual machines VM1 808 and VM2 810 from S2 822 storing VA2 814 based on Add2 828, and obtain data of virtual machine VM3 818 for virtual machine 820) from S3 824 storing VA3 816 based on Add3 830, thereby obtaining, all virtual machine data requested by VA1 806. In a case where VA1 806 partially shares a certain virtual machine with another virtual appliance, the user may obtain the desired virtual machine according to annotation information of the resource address and further applying customization information on the basis of the virtual machine downloaded. When P2P transmission is supported, user A 802 may also further obtain data of VA1 806, VA2 814, and VA3 816 from user devices of other users having already downloaded or currently downloading VA1 806, VA2 814, and VA3 816, respectively, thereby obtaining all data of the required specific virtual appliance VA1 806. These download paths are shown by dotted lines.

As compared to the way of directly downloading VA1 806 only from the cloud data center 800 in the prior art, the example of FIG. 8 obviously provides more available download sources. In this way, the user may selectively download pieces of the virtual machine data required by VA1 806 from a plurality of download sources simultaneously, thereby greatly improving the efficiency of obtaining the specific virtual appliance VA1 806. On the other hand, since the user may obtain data of VA1 806 through other download sources, the network pressure on the cloud data center 800 is reduced.

Figure 9:
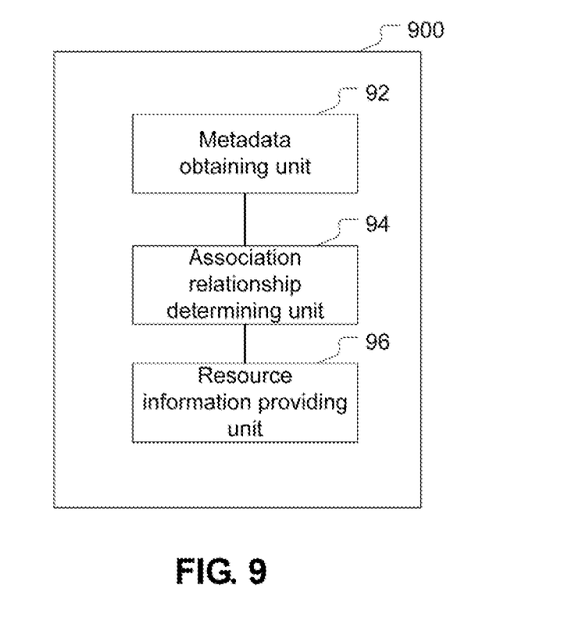
FIG. 9 shows a block diagram of an apparatus according to one embodiment.

Based on the same inventive concept, another embodiment also presents an apparatus for providing a virtual appliance. FIG. 9 shows a block diagram of an apparatus according to one embodiment. In FIG. 9, the apparatus for providing a virtual appliance is denoted by 900 as a whole. As shown in FIG. 9, the apparatus 900 includes: a metadata obtaining unit 92 configured to obtain metadata of a specific virtual appliance, based on a received request for obtaining the specific virtual appliance, the metadata describing information about virtual machines involved in the specific virtual appliance; an association relationship determining unit 94 configured to determine an association relationship between the specific virtual appliance and at least one other virtual appliance according to the metadata; a resource information providing, unit 96 configured to provide resource information for obtaining the specific virtual appliance according to the association relationship, the resource information including a plurality of resource addresses, at least one of the plurality of resource addresses pointing to a storage location of the at least one other virtual appliance.

In one embodiment, the metadata obtaining unit 92 may be configured to determine the specific virtual, appliance to be obtained based on the received request and obtain corresponding metadata based on the determined virtual appliance.

Further, according to one embodiment, the request for obtaining the specific virtual appliance may be issued by using a seed the in the P2P transmission; accordingly, the metadata obtaining unit 92 may be configured to determine the specific virtual appliance to be obtained through the analysis on target file information in the seed file.

According to one embodiment, the metadata obtaining unit 92 may be further configured to extract a descriptor file for describing virtual machines involved from a packaged data packet corresponding to the specific virtual appliance, and take the descriptor file as metadata of the specific virtual appliance.

In one embodiment, the association relationship determining unit 94 may include (not shown): a virtual machine information obtaining module configured to obtain virtual machine information of respective virtual machines involved in the specific virtual appliance from the metadata; a virtual machine information comparing module configured to compare the obtained virtual machine information of respective virtual machines involved in the specific virtual appliance to virtual machine information corresponding to at least one other virtual appliance; and a determining module configured to determine, in response to virtual machine information of a certain virtual machine in the specific virtual appliance being the same as virtual machine information of corresponding virtual machine in the at least one other virtual appliance, the association relationship as that the specific virtual appliance and the at least one other virtual appliance share the certain virtual machine.

According to one embodiment, the determining module may be further configured to, in response to virtual machine information of the certain virtual machine being the same as virtual machine information of the corresponding virtual machine but their customization information being different, determine the association relationship as that the specific virtual appliance and the at least one other virtual appliance share the certain virtual machine partially.

In one embodiment, the association relationship determining unit 94 may be configured to read information related with the specific virtual appliance from a pre-calculated and maintained association relationship record, thereby determining the association relationship between the specific virtual appliance and the at least one other virtual appliance.

In one embodiment, the resource information providing unit 96 may include (not shown): a storage location determining module configured to determine storage locations of the specific virtual appliance and the at least one other virtual appliance associated thereto according to the association relationship; a resource address generating module configured to generate a plurality of resource addresses, at least one of which points to a storage location of the at least one other virtual appliance; and a providing module configured to provide resource information based on the plurality of resource addresses.

According to one embodiment, the storage locations may comprise storage locations of the specific virtual appliance and the at least one other virtual appliance in a user device of other users.

According to another embodiment, the providing module may be configured to order the plurality of resource addresses generated; and provide the ordered plurality of resource addresses in resource information.

According to one embodiment, the resource information may further comprise annotation information provided for at least pan of the plurality of resource addresses, the annotation information comprising at least one of: data portion shared and sharing type.

In another embodiment, the apparatus 900 may be included in a cloud data center. In another embodiment, the apparatus 900 may be embodied as an independent tool in communication with a cloud data center, thus assisting the cloud data center in providing the virtual appliance to the user.

The specific way of implementing the apparatus 900 for providing a virtual appliance may be obtained by referring to the description of the method of FIG. 4 in combination with specific examples, and will not be repeated for the sake of brevity.

With the method and apparatus of the embodiments described herein, when a user requests a cloud data center for obtaining a virtual appliance, more resource options may be provided, to the user, thereby improving the efficiency of the user obtaining the virtual appliance and reducing network transmission pressure on the cloud data center.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing a virtual appliance, the method comprising:
obtaining metadata of a specific virtual appliance based on a received request for obtaining the specific virtual appliance, the metadata describing information about virtual machines involved in the specific virtual appliance;
determining an association relationship between the specific virtual appliance and at least one other virtual appliance according to the metadata, comprising:
obtaining virtual machine information of respective virtual machines involved in the specific virtual appliance from the metadata;

comparing the obtained virtual machine information of respective virtual machines involved in the specific virtual appliance to virtual machine information corresponding to the at least one other virtual appliance;

in response to virtual machine information of a certain virtual machine in the specific virtual appliance being the same as virtual machine information of corresponding virtual machine in the at least one other virtual appliance, determining the association relationship as that the specific virtual appliance and the at least one other virtual appliance share the certain virtual machine; and in response to virtual machine information of the certain virtual machine being the same as virtual machine information of the corresponding virtual machine except for their customization information being different, determining the association relationship as being that the specific virtual appliance and the at least one other virtual appliance share the certain virtual machine partially; and providing resource information for obtaining the specific virtual appliance according to the association relationship, comprising:

determining storage locations of the specific virtual appliance and the at least one other virtual appliance associated thereto according to the association relationship;

generating a plurality of resource addresses, at least one of which points to a storage location of the at least one other virtual appliance;

ordering the plurality of resource addresses generated to produce an ordered plurality of resource addresses; and providing the resource information including the ordered plurality of resource addresses, wherein the resource information comprises a plurality of resource addresses, at least one of the plurality of resource addresses pointing to a storage location of the at least one other virtual appliance, and wherein the storage locations comprise at least one storage location of the specific virtual appliance and at least one storage location of the at least one other virtual appliance in a user device of other users.

2. The method of claim 1, wherein the request is received via a seed file in peer-to-peer (P2P) transmissions, the seed file comprising target file information.

3. The method of claim 1, wherein the obtaining the metadata of the specific virtual appliance comprises determining the specific virtual appliance to be obtained based on the received request and obtaining corresponding metadata based on the determined specific virtual appliance by analysis on the target file information in the seed file.

4. The method of claim 3, further comprising extracting attribute information of a compressed package or data packet for describing virtual machines corresponding to the specific virtual appliance, wherein the metadata comprises the attribute information extracted from the compressed package or data packet.

5. The method of claim 3, wherein the obtaining the corresponding metadata based on the determined virtual appliance comprises extracting a descriptor file for describing involved virtual machines from a packaged data packet corresponding to the specific virtual appliance, and taking the descriptor file as metadata about the specific virtual appliance.

6. The method of claim 1, wherein the resource information further comprises annotation information provided for at least part of the plurality of resource addresses, the annotation information comprising either: at least one data portion shared, at least one sharing type, or at least one data portion shared and at least one sharing type.

7. An apparatus for providing a virtual appliance, the apparatus comprising:

a metadata obtaining hardware processing unit configured to obtain metadata of a specific virtual appliance based on a received request for obtaining the specific virtual appliance, the metadata describing information about virtual machines involved in the specific virtual appliance ;

an association relationship determining hardware processing unit configured to determine an association relationship between the specific virtual appliance and at least one other virtual appliance according to the metadata, the association relationship determining hardware processing unit comprising:

a virtual machine information obtaining program module executable by the association relationship determining hardware processing unit to cause the association relationship determining hardware processing unit to obtain virtual machine information of respective virtual machines involved in the specific virtual appliance from the metadata;

a virtual machine information comparing program module executable by the association relationship determining hardware processing unit to cause the association relationship determining hardware processing unit to compare the obtained virtual machine information of respective virtual machines involved in the specific virtual appliance to virtual machine information corresponding to the at least one other virtual appliance;

a determining program module executable by the association relationship determining hardware processing unit to cause the association relationship determining hardware processing unit to:

determine, in response to virtual machine information of a certain virtual machine in the specific virtual appliance being the same as virtual machine information of corresponding virtual machine in the at least one other virtual appliance, the association relationship as that the specific virtual appliance and the at least one other virtual appliance share the certain virtual machine; and determine, in response to virtual machine information of the certain virtual machine being the same as virtual machine information of the corresponding virtual machine except for their customization information being different, the association relationship as being that the specific virtual appliance and the at least one other virtual appliance share the certain virtual machine partially; and a resource information providing hardware processing unit configured to provide resource information for obtaining the specific virtual appliance according to the association relationship, the resource information providing hardware processing unit comprising:

a storage location determining program module executable by the resource information providing hardware processing unit to cause the resource information providing hardware processing unit to determine storage locations of the specific virtual appliance and the at least one other virtual appliance associated thereto according to the association relationship;

a resource address generating program module executable by the resource information providing hardware processing unit to cause the resource information providing hardware processing unit to generate a plurality of resource addresses, at least one of which points to a storage location of the at least one other virtual appliance; and a providing program module executable by the resource information providing hardware processing unit to cause the resource information providing hardware processing unit to:

order the plurality of resource addresses generated to produce an ordered plurality of resource addresses; and provide the resource information including the ordered plurality of resource addresses, wherein the resource information includes a plurality of resource addresses, at least one of the plurality of resource addresses pointing to a storage location of the at least one other virtual appliance, and wherein the storage locations comprise at least one storage location of the specific virtual appliance and at least one storage location of the at least one other virtual appliance in a user device of other users.

8. The apparatus of claim 7, wherein the metadata obtaining hardware processing unit is configured to determine the specific virtual appliance to be obtained based on the received request and obtain corresponding metadata based on the determined virtual appliance analysis on the target file information in the seed file.

9. The apparatus of claim 7, wherein the request is received via a seed file in peer-to-peer (P2P) transmission, the seed file comprising target file information.

10. The apparatus of claim 8, wherein the metadata obtaining hardware processing unit is configured to extract attribute information of a compressed package or data packet for describing virtual machines corresponding to the specific virtual appliance, wherein the metadata comprises the attribute information extracted from the compressed package or data packet.

11. The apparatus of claim 8, wherein the metadata obtaining hardware processing unit is further configured to:

extract a descriptor file for describing involved virtual machines from a packaged data packet corresponding to the specific virtual appliance; and take the descriptor file as metadata about the specific virtual appliance.

12. The apparatus of claim 7, wherein the resource information further comprises annotation information provided for at least part of the plurality of resource addresses, the annotation information comprising either: at least one data portion shared, at least one sharing type, or at least one data portion shared and at least one sharing type.

* * * * *